United States Patent [19]

Sreeves

[11] 4,145,370

[45] Mar. 20, 1979

[54] POWDERED COATING COMPOSITION OF CARBOXYL TERMINATED POLYESTER, EPOXY RESIN AND ZINC OXIDE

[75] Inventor: John E. Sreeves, Solihull, England

[73] Assignee: British Industrial Plastics, Ltd., Manchester, England

[21] Appl. No.: 837,621

[22] Filed: Sep. 27, 1977

[30] Foreign Application Priority Data

Sep. 27, 1976 [GB] United Kingdom ............... 40068/76

[51] Int. Cl.$^2$ .............................................. C08L 63/00
[52] U.S. Cl. ............................... 260/835; 260/37 EP; 260/836; 260/837 R
[58] Field of Search ......................................... 260/835

[56] References Cited

U.S. PATENT DOCUMENTS

| | | | |
|---|---|---|---|
| 3,268,477 | 8/1966 | Mueller | 260/47 |
| 3,576,903 | 4/1971 | Groff | 260/835 |
| 3,966,836 | 6/1976 | Cleur | 260/835 |
| 3,979,477 | 9/1976 | Schmid | 260/835 |
| 4,085,159 | 4/1978 | Marsiat | 260/835 |

FOREIGN PATENT DOCUMENTS 1275768  5/1972  United Kingdom ..................... 260/835

OTHER PUBLICATIONS

Edward C. Janis, "Elevated Temperature Resistant Metal to Metal Adhesives" ASTM Special Technical Publication No. 271 (1959), pp. 18-36.

*Primary Examiner*—Paul Lieberman
*Attorney, Agent, or Firm*—Cushman, Darby & Cushman

[57] ABSTRACT

A powder coating composition which comprises a carboxyl terminated polyester resin having a carboxyl functionality of at least 2, an epoxy resin which is at least difunctional with respect to epoxy groups and zinc oxide. The amount of zinc oxide is at least 1% by weight of the total weight of the resins, and the amounts of resins are such that the ratio of functional epoxy groups to carboxyl groups on a chemical equivalent basis is in the range 0.5:1.0 up to 3.0:1.0.

7 Claims, No Drawings

POWDERED COATING COMPOSITION OF CARBOXYL TERMINATED POLYESTER, EPOXY RESIN AND ZINC OXIDE

This invention relates to coatings, and more particularly to an improved powder coating composition.

According to the invention a powder coating composition comprises a carboxyl terminated polyester resin having a carboxyl functionality of at least 2, an epoxy resin which is at least di-functional and zinc oxide, the amounts of carboxyl terminated polyester and epoxy resin being such that the ratio of functional epoxy groups to carboxyl groups on a chemical equivalent basis is in the range 0.5:1.0 up to 3.0:1.0 and the amount of zinc oxide in the composition being at least 1% by weight based on the total weight of polyester and epoxy resins.

Powder coating systems using a mixture of carboxyl terminated polyester resin and epoxy resin are well-known and widely used for coating metal substrates in the manufacture of domestic appliances, garden and office furniture and automotive components.

The coating is applied as a powder and fused together into a film and cured by the application of heat.

The polyesters used are typical polycondensation products based on mixtures of polycarboxylic acids, including derivatives thereof such as esters and anhydrides, and polyhydric alcohols, including compounds which can behave as functional equivalents of alcohols, such as glycidyl esters. The polyesters may be modified with other components in order to obtain specific properties as desired.

Examples of polycarboxylic acids and their derivatives which can be used are isophthalic acid, terephthalic acid, phthalic acid, esters thereof such as dimethyl terephthalate, adipic acid, trimellitic anhydride, hemimellitic anhydride and phthalic anhydride. Examples of polyhydric compounds are propylene glycol, neopentyl glycol, ethylene glycol, and an example of a compound capable of functioning as a polyhydroxy compound is a glycidyl ester of formula:

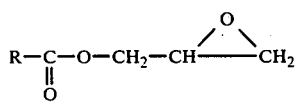

wherein R represents a saturated aliphatic hydrocarbon group.

A process for manufacturing a preferred polyester is described in our co-pending U.K. Patent Application No. 45340/75. The process comprises:

(i) preparing a linear polyester (A) free from cross linkable unsaturation and having a hydroxyl value of from 25 to 75 and an acid value of from 0 to 20 by reacting a polyester precursor with a glycidic ester, the polyester precursor being the product of partial condensation of at least one dicarboxylic acid or ester thereof with at least one diol, the amount of glycidyl ester in the linear polyester (A) being in the range 2 to 10 mole % of total diol plus glycidyl ester (ii) reacting the linear polyester (A) with (B) and anhydride of an aromatic di-or poly-carboxylic acid to yield a cross-linkable carboxy-terminated polyester resin having an acid value of from 50 to 150 and a softening point of from 90° C. to 120° C.

By "cross linkable unsaturation" in this context is meant carbon-carbon unsaturation occurring in an aliphatic carbon chain.

Examples of suitable epoxy resins are Epikote 1004 and Epikote 1055 (commercially available from Shell Chemicals Ltd.) and Dow 5559 and Dow 642U (commercially available from Dow Chemical Company).

We have found that, in the powder coating composition of the present invention, the presence of the zinc oxide results in improved film flexibility and impact strength in the coatings prepared from the composition, both of which properties are of considerable importance in the uses to which the powder coatings are generally directed.

It is preferred that the amounts of the resins are such that the ratio of functional epoxy groups to carboxyl groups in the composition is greater than 1:1 (washing resistance is lower if terminal carboxyl groups are present), the particularly preferred range being 1.1 to 1.5:1.0 and also that the amount of zinc oxide in the composition is at least 2.5% by weight of the total resin. There is no clear-cut top limit in the amount of zinc oxide which may be used, so that the weight of zinc oxide could equal the total weight of the resins. However, the zinc oxide has an effect upon other film properties such as gloss and colour so that in general the amount of zinc oxide in the composition would not be expected to exceed 50% by weight of the total weight of resin. Although not essential, colloidal zinc oxide is the preferred grade, since this material has little pigmentary value and its use imposes no restrictions on the range of colours which can be produced.

If desired pigments may be added to the composition, the amount in this case depending upon the nature of the pigment. A white pigment would generally be used in an amount up to 50% by weight, based on total weight of resin, whereas other colours would not normally be used in amounts greater than 20% by wt. and the black pigment, carbon black, would be used only in small amounts e.g. 1 to 2% by wt.

Other additives such as flow agents may also be included in the composition in the usual way.

The invention is described in more detail in the following Examples.

EXAMPLES 1 to 4

A powder was made to the following formulation.

|  | % |
| --- | --- |
| Carboxyl terminated polyester | 27.5 |
| Epikote 1055 (Epoxy resin) | 38.9 |
| Modaflow (Flow agent) | 0.35 |
| Runa R.O.676 (Titanium Dioxide) | 33.25 |

Modaflow is commercially available from Monsanto Chemicals Ltd.

Runa R.O.676 is commercially available from Laporte Industries Ltd.

To portions of this powder were added, by blending followed by dispersion and comminution, varying quantities of colloidal zinc oxide.

The resultant powders were spray-applied to steel panels and cured for 30 minutes at 180° C.

The film properties of the coatings so produced were measured by various standard tests, the results obtained being as follows.

| Example No. | 1 | 2 | 3 | 4 |
|---|---|---|---|---|
| % Zinc Oxide (addition) | 0 | 1.0 | 2.5 | 5.0 |
| Koenig Hardness (secs) | 219 | 219 | 218 | 219 |
| 45° Gloss | 84 | 100 | 98 | 106 |
| Distensibility (mm) | 1.5 | 9.4 | 9.7 | 9.6 |
| Flexibility | Fails ⅛" | Passes ⅛" | Passes ⅛" | Passes ⅛" |
| Conical Mandrel (mm) | Total Failure | 27 | 0 | 0 |
| Reverse Impact (BS 3900) | Fails 0 | Passes 0 Fails 1 | Passes 0 Fails 1 | Passes 4 Fails 5 |

The carboxyl terminated polyester had the following molar composition.

| Propylene glycol | 5.5 |
|---|---|
| Neo-pentyl glycol | 4.6 |
| DiMethyl terephthalate | 2.75 |
| Isophthalic acid | 6.0 |
| Adipic Acid | 0.75 |
| Cardura E* | 0.5 |
| Trimellitic anhydride | 2.0 |

*Cardura E is the glycidyl ester of Versatic 911 and is commercially available from Shell Chemicals Ltd. and has the formula:-

$$R_2-\underset{\underset{R_2}{|}}{\overset{\overset{R_1}{|}}{C}}-\overset{\overset{O}{\|}}{C}-O-CH_2-CH\overset{O}{\overbrace{\phantom{XX}}}CH_3$$

where $R_1$, $R_2$ and $R_3$ are saturated aliphatic chains.

Epikote 1055 is a solid epoxide resin based on Bisphenol A and Epichlorhydrin and the calculated ratio of epoxy groups to carboxyl groups in the coating system was calculated to be 1:1.

EXAMPLES 5 to 8

Powders were made to the following formulations:

| Example No. | 5 | 6 | 7 | 8 |
|---|---|---|---|---|
| Carboxyl terminated polyester | 34.0 | 34.0 | 34.0 | 34.0 |
| Epikote 1001 | 25.7 | 25.7 | 25.7 | 25.7 |
| Tioxide R-CR-2 | 39.5 | 36.5 | 33.5 | 30.5 |
| colloidal zinc oxide | 0.0 | 3.0 | 6.0 | 9.0 |
| Modaflow powder | 0.8 | 0.8 | 0.8 | 0.8 |

The powders were spray-applied to mild steel panels and cured for 30 minutes at 180° C.

The film properties of the coatings so produced were as follows.

| | 5 | 6 | 7 | 8 |
|---|---|---|---|---|
| Koenig hardness (secs) | 212 | 210 | 208 | 212 |
| Flexibility (mandrel) | passes ⅛" | passes ⅛" | passes ⅛" | passes ⅛" |
| Conical Mandrel | no failure | no failure | no failure | no failure |
| Distensibility (m.m) | 8.5 | 8.7 | 8.0 | 8.5 |
| Reverse Impact (BS 2900) (washers) | passes 0 fails 1 | passes 0 fails 1 | passes 3 fails 4 | passes 3 fails 4 |
| Reverse Impact ASTM 2794-69 (cm.kg) | fails 10 | passes 20 fails 30 | passes 200 | passes 200 |
| Film build (Thou.) | 2.0 | 2.0 | 2.0 | 2.0 |

Notes

The carboxyl terminated polyester is the same as that used in Examples 1 to 4.

Epikote 1001 has an epoxide equivalent of 450-525.

Tioxide R-CR-2 is a proprietary grade of Rutile titanium dioxide commercially available from Tioxide International.

Modaflow powder is a proprietary flow additive available from Monsanto Chemicals Ltd.

The carboxyl/epoxy ratio is calculated to be 1/1.

EXAMPLES 9 and 10

A second polyester was prepared with the molar composition tabulated below, the procedure used for the preparation being as follows:

250.8g of propylene glycol, 871.5g of terephthalic acid, 287.0g of neopentyl glycol and 65.7g of adipic acid were charged to a reactor together with 0.3g of dibutyl tin oxide as catalyst. This batch was then heated to 194° C. whereupon distillation of water from the reactor commenced. The reactor temperature rose to 205° C. and the amount of water distilled over was 58ml.

73.5g of Cardura E was then added and the temperature of the batch was increased to 245° C. and held at that temperature until the product had an acid value of 7.7. At this point the total water distilled over was 201 ml. The temperature of the bath was then reduced to 190° C. and 220.7g of trimellitic anhydride was added. The batch was held at 190° C. until the product had an acid value of 99 and was then cooled and discharged.

The final product had an acid value of 96.2 and a softening point of 108°-109° C. by the ball and ring method.

| propylene glycol | 5.5 |
|---|---|
| neopentyl glycol | 4.6 |
| terephthalic acid | 8.75 |
| adipic acid | 0.75 |
| Cardura E | 0.5 |
| trimellitic anhydride | 2.0 |

Powders were made to the following compositions.

| Example No. | 9 | 10 |
|---|---|---|
| Carboxyl terminated polyester | 27.0 | 27.0 |
| Epikote 1055 | 39.5 | 39.5 |
| Modaflow | 0.135 | 0.135 |
| Tioxide R-CR-2 | 33.5 | 27.5 |
| colloidal zinc oxide | 0 | 6.0 |

The carboxyl/epoxy ratio is calculated to be 1/1.
The powders were spray-applied to mild steel panels and cured for 30 minutes at 160° C.
Some film properties were as follows.

| | 9 | 10 |
|---|---|---|
| Film build (thou.) | 2.0 | 2.0 |
| Hardness (Koenig) secs | 200 | 201 |
| Flexibility (mandrel) | fails ¼" | passes ⅛" |
| Distensibility (m.m) | 2.0 | 9.0 |
| Reverse Impact | | |
| BS3900 (washers) | fails 0 | passes 4 fails 5 |
| ASTM 2794-69 (cm. kg) | fails 10 | passes 200 |

Note

In the above examples the tests employed to measure physical properties were all standard tests as follows:

| Koenig Hardness | BS 3900 Part E-5 |
|---|---|
| Distensibility | BS 3900 Part E-4 |
| Flexibility | BS 3900 Part E-1 |

| | |
|---|---|
| Conical Mandrel | ASTM D522-60 |
| Reverse Impact (two different tests) | BS 3900 part E-3 and ASTM 2794-69 |

I claim:

1. A powder coating composition comprising a carboxyl terminated polyester resin having a carboxyl functionality of at least 2, an epoxy resin which is at least di-functional with respect to epoxy groups, and zinc oxide, the amounts of carboxyl terminated polyester and epoxy resin being such that the ratio of functional epoxy groups to carboxyl groups on a chemical equivalent basis is in the range 0.5:1.0 up to 3.0:1.0 and the amount of zinc oxide in the composition being at least 1% by weight based on the total weight of polyester and epoxy resins.

2. A powder coating composition according to claim 1 in which the amounts of the polyester and epoxy resins are such that the ratio of functional epoxy groups to carboxyl groups in the composition is greater than 1:1.

3. A powder coating composition according to claim 2 in which the ratio of functional epoxy groups to carboxyl groups in the composition is in the range 1:1 to 1.5:1.0.

4. A powder coating composition according to claim 1 in which the amount of zinc oxide in the composition is at least 2.5% by weight based on the total weight of polyester and epoxy resins.

5. A powder coating composition according to claim 4 in which the amount of zinc oxide is not more than 50% by weight of the total weight of resin.

6. A powder coating composition according to claim 1 in which the zinc oxide is colloidal zinc oxide.

7. A powder coating composition according to claim 1 comprising also one or more pigments.

* * * * *